United States Patent
Bottari

(10) Patent No.: US 9,714,839 B2
(45) Date of Patent: Jul. 25, 2017

(54) APPARATUS AND METHOD FOR USE WITH A NAVIGATION SYSTEM

(71) Applicant: TELEFONAKTIEBOLAGET L M ERICSSON (PUBL), Stockholm (SE)

(72) Inventor: Giulio Bottari, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/780,024

(22) PCT Filed: Mar. 28, 2013

(86) PCT No.: PCT/EP2013/056796
§ 371 (c)(1),
(2) Date: Sep. 25, 2015

(87) PCT Pub. No.: WO2014/154301
PCT Pub. Date: Oct. 2, 2014

(65) Prior Publication Data
US 2016/0047673 A1 Feb. 18, 2016

(51) Int. Cl.
*G01C 21/36* (2006.01)

(52) U.S. Cl.
CPC ..... *G01C 21/3697* (2013.01); *G01C 21/3629* (2013.01)

(58) Field of Classification Search
CPC combination set(s) only.
See application file for complete search history.

(56) References Cited

U.S. PATENT DOCUMENTS

2011/0258267 A1  10/2011  Tozaki et al.

FOREIGN PATENT DOCUMENTS

JP  2004348367 A  12/2004

OTHER PUBLICATIONS

Asta*Muse machine translation of Japanese Published Application No. 2004-348367, Dec. 9, 2004, 22 pages annotated.*
International Search Report issued in corresponding International application No. PCT/EP2013/056796, dated Nov. 29, 2013, 3 pages.

* cited by examiner

*Primary Examiner* — Edward J Pipala
(74) *Attorney, Agent, or Firm* — Rothwell, Figg, Ernst & Manbeck, P.C.

(57) ABSTRACT

A method for announcing content information in a navigation system, wherein the content information relates to non guidance direction instructions. The method comprises the step of receiving route information, the route information comprising a plurality of route segments that constitute a route from a start point to an end point, each route segment having an estimated time period for completion. The method also comprises the step of receiving content information which is to be announced. It is determined whether one or more of the route segments comprises an estimated time period for completion which is above a threshold value, and, if so, allocating such route segments as silent route segments. Content information is announced in one or more of the determined silent route segments.

14 Claims, 7 Drawing Sheets

| SILENT Route Segment | DURATION |
|---|---|
| S4 | 5 minutes |
| S9 | 8 minutes |
| S12 | 5.2 minutes |
| ⋮ | ⋮ |

Figure 3

| SILENT Route Segment | DURATION | CONTENT INFORMATION SEGMENT |
|---|---|---|
| S4 | 5 minutes | 5 minutes |
| S9 | 8 minutes | 8 minutes |
| S12 | 5.2 minutes | 5.2 minutes |
| ⋮ | ⋮ | ⋮ |

Figure 4

| SILENT Route Segment | DURATION | CONTENT INFORMATION SEGMENT |
|---|---|---|
| S4 | 5 minutes | 3 minutes |
| S9 | 8 minutes | 6 minutes |
| S12 | 5.2 minutes | 3.2 minutes |
| ⋮ | ⋮ | ⋮ |

Figure 5

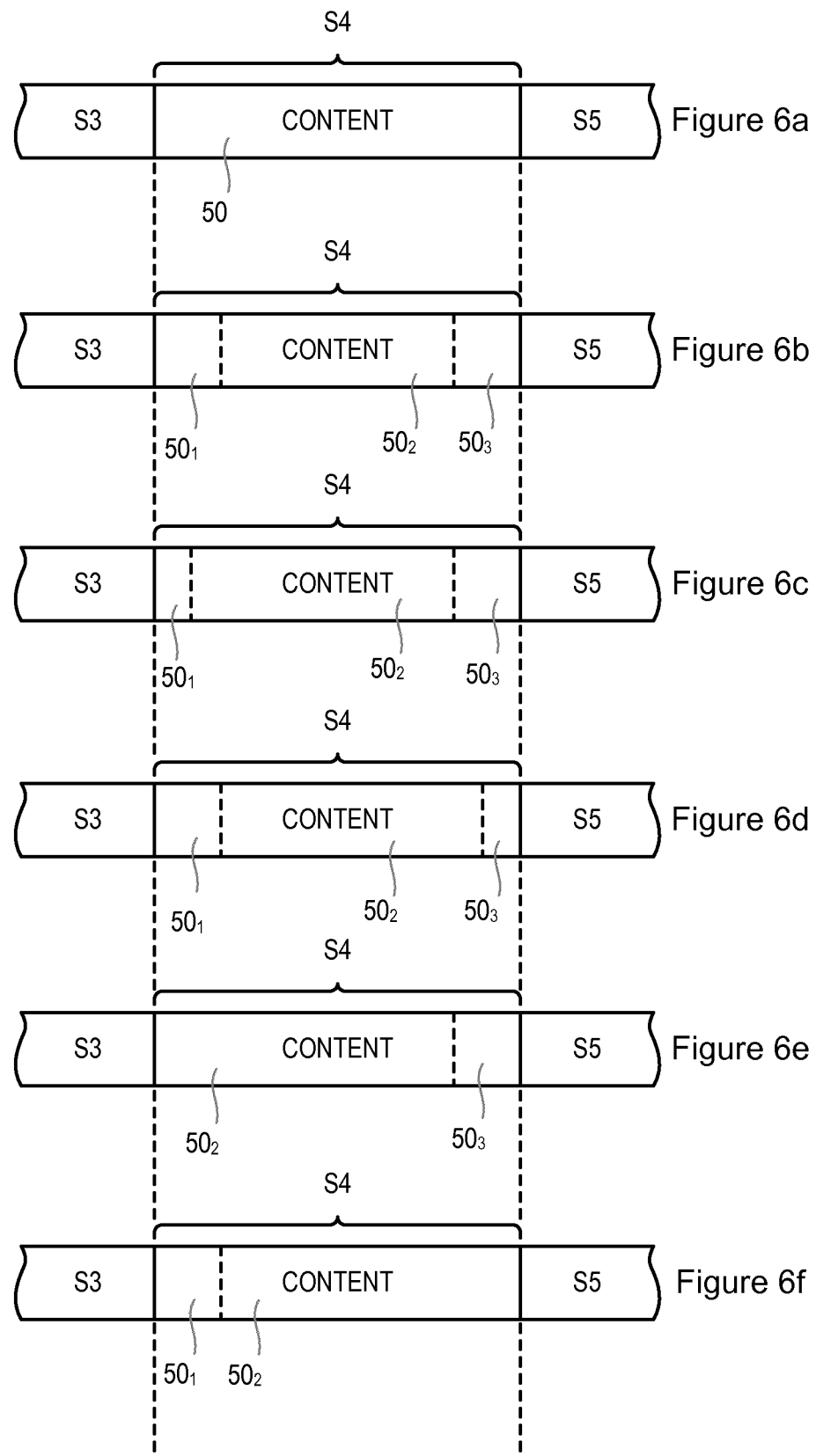

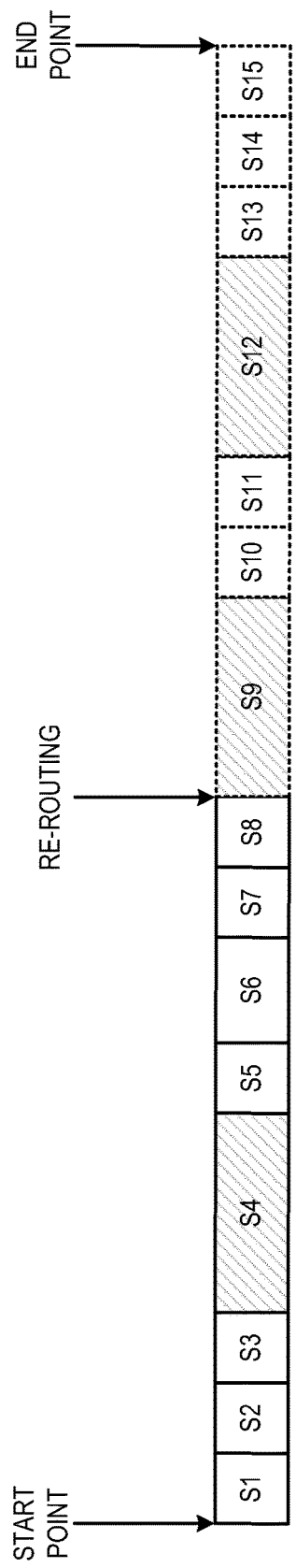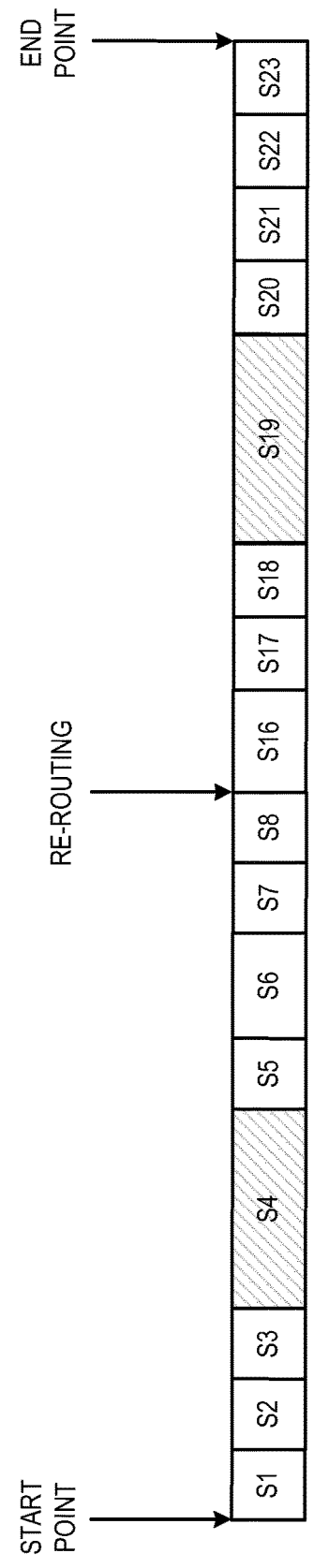

APPARATUS AND METHOD FOR USE WITH A NAVIGATION SYSTEM

CROSS REFERENCE TO RELATED APPLICATION(S)

This application is a 35 U.S.C. §371 National Phase Entry Application from PCT/EP2013/056796, filed Mar. 28, 2013, the disclosure of which is herein incorporated by reference in its entirety.

TECHNICAL FIELD

The present invention relates to an apparatus and method for use with a navigation system, and in particular to an apparatus and method for announcing content information in a navigation system.

BACKGROUND

Navigation systems such as Global Positioning System (GPS) devices have become a common feature of cars being used on roads today. More recently, such GPS devices are being manufactured with integral telecommunication functionality, for example whereby telecommunication cards are provided within the GPS device (for example a General Packet Radio Service (GPRS) card, an Enhanced Data rates for GSM Evolution (EDGE) card or a Long Term Evolution (LTE) card). The provision of such telecommunication functionality on a GPS device enables online services to be provided during the road navigation, for example traffic conditions, current fuel prices, weather forecasts. These "live" services are already available on most stand-alone car navigation systems, and are also available on other devices such as smartphones that have navigation applications. These services display information on the screen of the device.

All these devices also have a "read aloud" function, whereby a text-to-speech engine converts written text corresponding to driving instructions such as "turn right into main street" into the sound of a human voice. These verbal instructions complement the driving information displayed on the screen of the navigation device, such that the driver does not need to look at the map to receive driving instructions.

At the beginning of a trip, the driver has to select a destination on the screen of the device, with the current position being the starting point. In addition, the driver can set several options or criteria, for example selecting a shortest path, fastest path, or avoiding highways. Once such selections are made the driver clicks on "Start navigation".

The navigation device runs a routing algorithm to find the best route according to the end points (i.e. current position and user selected destination), the map database and the user selected criteria. The outcome of the routing algorithm is a sequence of hops and turning points. Some hops are short, for example when the car is moving in an urban area where frequent turns are required, while other hops are longer, for example when the car is moving on a highway.

Maps are usually complemented with a collection of Points of Interest (POI). These are locations, typically a gas station, a hotel, a restaurant, a shopping mall, or a historical location. The data for the POI database is collected from a variety of sources. In some cases the mapping companies collect it, sometimes the data is provided directly to mapping companies from larger chain locations, and other times the information is gathered by companies who specialize in creating business directories.

Some navigation systems provide what is termed "Location Aware Touring", whereby information about a particular location is presented visually to a driver as the driver is passing a particular point of interest. Such systems rely on a GPS location being used to trigger the generation and conveyance of particular visual information, i.e. based on the navigation device being at a particular point or location.

This type of system is similar to information systems used in museums and the like, as a visitor moves from one room to another room, whereby relevant commentary is provided along the route, for example providing background to a painting being displayed at a museum.

These types of systems provide a collection of prerecorded audio files that are merely activated according to the current position of the navigation device.

Navigation systems such as those described above have the disadvantage that the additional information is displayed on a screen, which is impractical while driving. In addition, other types of systems which provide audio information to tourists visiting museums and the like, provide such information in response to a navigation device being located at a particular location, which can often be an impractical time to receive information if used in the context of navigation systems providing route guidance.

SUMMARY

It is an aim of the present invention to provide a method and apparatus which obviate or reduce at least one or more of the disadvantages mentioned above.

According to a first aspect of the present invention, there is provided a method for announcing content information in a navigation system, wherein the content information relates to non guidance-direction instructions. The method comprises the steps of: receiving route information, the route information comprising a plurality of route segments that constitute a route from a start point to an end point, each route segment having an estimated time period for completion; and receiving content information which is to be announced. It is determined whether one or more of the route segments comprises an estimated time period for completion which is above a threshold value and, if so, allocating such route segments as silent route segments. The content information is announced in one or more of the determined silent route segments.

According to another aspect of the present invention, there is provided an apparatus for announcing content information in a navigation system, wherein the content information relates to non guidance-direction instructions. The apparatus comprises an input interface adapted to receive: route information, the route information comprising a plurality of route segments that constitute a route from a start point to an end point, each route segment having an estimated time period for completion; and content information which is to be announced. The apparatus comprises a processing unit configured to determine whether one or more of the route segments comprises an estimated time period for completion which is above a threshold value and, if so, allocate such route segments as silent route segments. The apparatus comprises an output interface for outputting content information which is to be announced in one or more of the silent route segments.

According to another aspect of the invention there is provided a navigation device comprising an apparatus as defined in the appended claims.

According to another aspect of the invention there is provided a computer program product for announcing content information in a navigation system, comprising code for causing, when executed, a navigation device to execute the method defined in the appended claims.

BRIEF DESCRIPTION OF THE DRAWINGS

For a better understanding of the present invention, and to show more clearly how it may be carried into effect, reference will now be made, by way of example only, to the following drawings in which:

FIG. 3 shows a table illustrating an example of a list of silent route segments;

FIG. 4 shows a table illustrating an example of a list of silent route segments, and how content information segments may be associated with silent route segments according to an embodiment of the present invention; and FIG. 5 shows a table illustrating an example of a list of silent route segments, and how content information segments may be associated with silent route segments according to another embodiment of the present invention.

FIGS. 6a to 6f shows examples of how a content information segment may be arranged within a silent route segment according to various embodiments of the present invention;

FIGS. 7a and 7b shows an example of route segments forming a route from a start point to an end point, and an example of how the route segments can change when a route is updated;

DETAILED DESCRIPTION

The embodiments of the invention described below relate to methods and apparatus for announcing content information in a navigation system. For example, the embodiments of the invention aim to improve driver experience by providing a system which "reads aloud" infotainment content smoothly alternated with driving instructions, without the need to read a screen. Although the embodiments will be described in relation to a navigation system for use in a vehicle, it is noted that the methods and apparatus described herein are also applicable to any form of navigation system, including hand held navigation systems, for example as used in smartphones.

Figure 1:
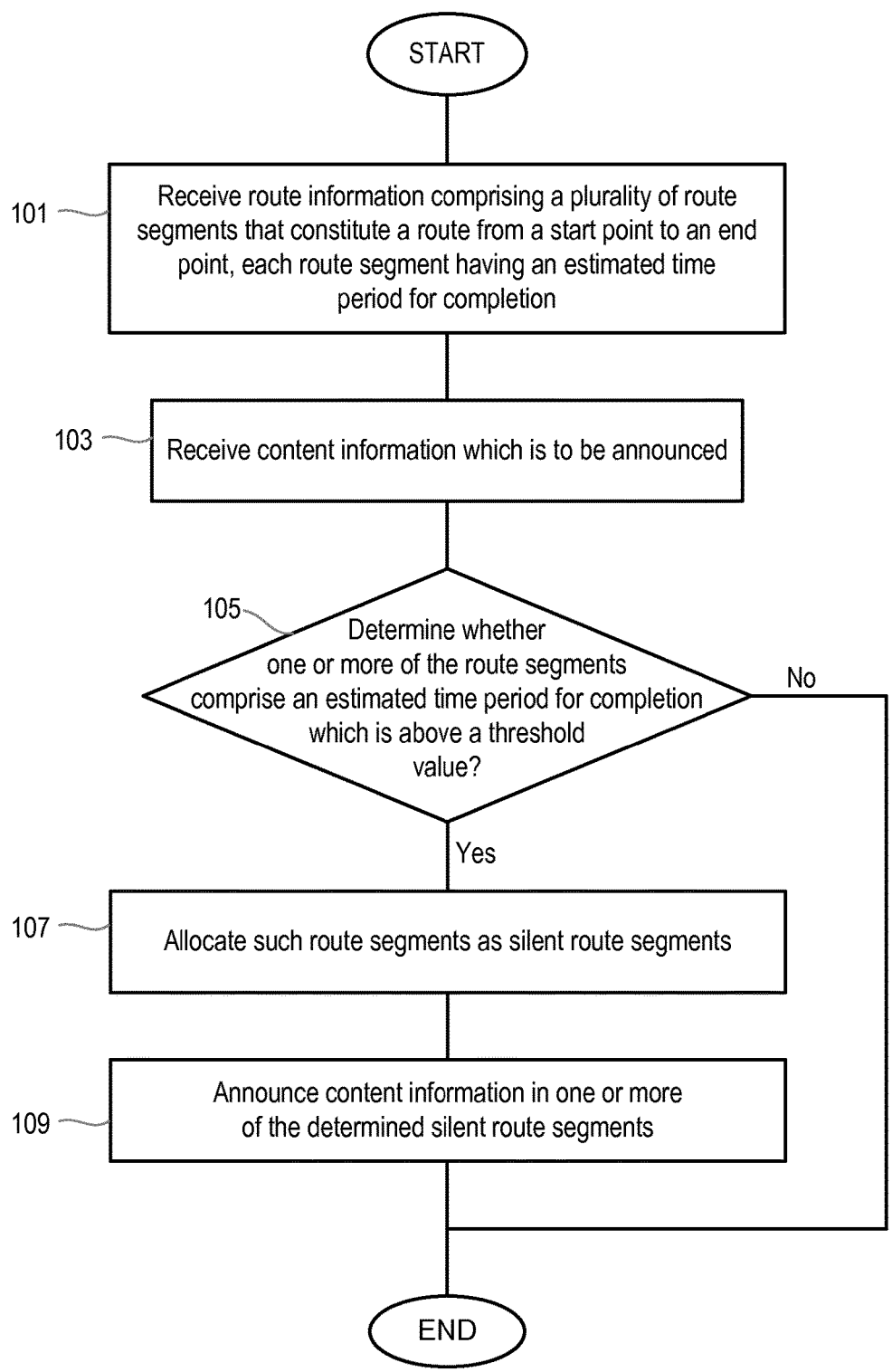
FIG. 1 shows a method according to an embodiment of the present invention.
Figure 2:
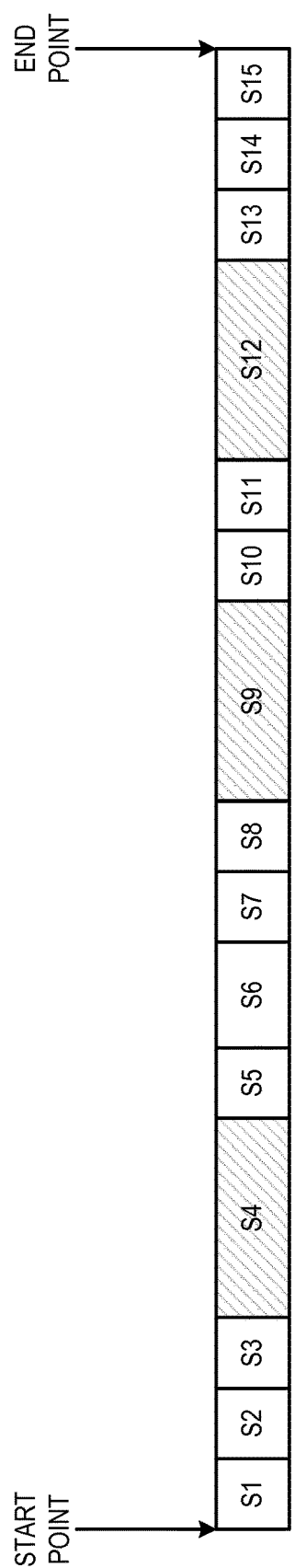
FIG. 2 shows an example of route segments forming a route from a start point to an end point.

FIG. 1 shows a method according to a first embodiment, for announcing content information in a navigation system. By "announcing" it is meant that audible information is provided. The content information relates to non guidance-direction instructions. The method comprises the step of receiving route information, step 101, the route information comprising a plurality of route segments that constitute a route from a start point to an end point. An example of a typical route is shown in FIG. 2, whereby route segments S1 to S15 are provided along a route from a starting point to an end point. Each route segment has an estimated time period for completion.

The method also comprises the step of receiving content information which is to be announced, step 103. It is noted that the steps of receiving the route information and content information may be performed in any order, or can overlap, or can be performed simultaneously.

The method involves determining whether one or more of the route segments comprises an estimated time period for completion which is above a threshold value, step 105, and, if so, allocating such route segments as silent route segments, step 107. For example, referring again to FIG. 2 it is shown that route segments S4, S9 and S12 are determined as having estimated time periods for completion that are above a threshold value, and have been allocated as silent route segments (indicated by hatched lines).

The content information is announced in one or more of the determined silent route segments, step 109.

It is noted that the threshold value can be set in a number of ways, for example selected by a driver when selecting system preferences. Alternatively, the threshold value may be set or predetermined beforehand, for example based on values which have been found to provide the best results. According to one example the threshold value is set at a few minutes, in order to reduce the likelihood of confusion with standard route guiding instructions.

The embodiment above has the advantage of finding route segments which are long enough to announce content information, and then announcing the content information in one or more of such segments (depending on the size of the content information to be announced, and the size and number of silent route segments). The standard guidance-direction instructions tend to be announced near a boundary between one route segment and another route segment. For example, just before a boundary between two route segments a navigation system can announce guidance-direction instructions such as "prepare to turn right" followed by "turn right now". Just after a boundary between two route segments a navigation system can announce a guidance-direction instruction such as "now follow the A123 for eight miles". By determining which route segments are longer than a certain threshold value, the embodiments of the invention are able to determine which one or more route segments have periods of time which are sufficiently silent (hence the term silent route segment) to enable content information to be announced.

It is noted that the content information may be retrieved from any source, including for example information received over a network such as the internet, or from a cloud computing resource. The content information can be retrieved according to user preferences, and then delivered to the driver during the road segments for which the estimated driving time is above a predefined threshold, i.e. during the one or more silent route segments determined above.

According to one embodiment the method further comprises the steps of partitioning the content information into a plurality of content information segments, and announcing each content information segment in a corresponding silent route segment.

The partitioning step may comprise the steps of forming a list of silent route segments and an associated duration of each silent route segment, and partitioning the content information such that the duration of a content information segment is a function of the duration of a corresponding silent route segment.

FIG. 3 shows an example of a list of silent route segments and the associated duration of each silent route segment. The example of FIG. 3 contains the silent route segments determined in the example of FIG. 2, i.e. whereby route segments S4, S9 and S12 are allocated as being silent route segments. In the example of FIG. 3 the silent route segment S4 is shown as having a duration of 5 minutes, the silent route segment S9 a duration of 8 minutes, and the silent route segment S12 a duration of 5.2 minutes.

When partitioning the content information, according to one embodiment the duration of a content information segment can be chosen to be substantially equal to the duration of a corresponding silent route segment. FIG. 4 shows such an example whereby the duration of a content information segment is substantially equal to the duration of a silent route segment. For example, the silent route segment S4 having a duration of 5 minutes can have a content information segment assigned thereto which is also 5 minutes in duration. In practice it will be appreciated that these durations may not be exactly the same, for example due to the time required to announce standard guidance-direction instructions near the boundary between route segments, as explained above. As such, in one embodiment the functional relationship between the duration of a content information segment ($T_{Content\_Information\_Segment}$) and a silent route segment ($T_{Silent\_Route\_Segment}$) may be defined as:

$$T_{Content\_Information\_Segment} = T_{Silent\_Route\_Segment} - T_{Guard\_Time}$$

, where $T_{Guard\_Time}$ is the guard time for announcing standard guidance-direction instructions near a boundary between route segments. In such an embodiment the duration of a content information segment is substantially the same as the duration of a silent route segment, less the time required to announce standard guidance-direction instructions. In such an embodiment a user is effectively receiving announcements relating to content information immediately after and immediately before standard guidance-direction instructions. In one example the user is able to control or set the guard time used for providing standard guidance-direction instructions.

Alternatively, the duration of a content information segment can be chosen to be less than the duration of a corresponding silent route segment. By making the duration of the content information segment less than the silent route segment itself, this has the advantage of preventing content information being announced immediately after a routing instruction, or immediately before the next routing instruction. For example, FIG. 5 shows such an example whereby the silent route segment S4 has a duration of 5 minutes while the corresponding content information segment assigned thereto has a duration of 3 minutes, the silent route segment S9 has a duration of 8 minutes while the corresponding content information segment assigned thereto has a duration of 6 minutes, the silent route segment S12 has a duration of 5.2 minutes while the corresponding content information segment assigned thereto has a duration of 3.2 minutes.

FIGS. 6a to 6f provide further details about the relationship between a content information segment and a silent route segment according to different embodiments of the invention.

Referring to FIG. 6a, the duration of a content information segment 50 is made substantially equal to the duration of a corresponding silent route segment, S4.

Alternatively, according to FIG. 6b the duration of a content information segment $50_2$ is less than the duration of a corresponding silent route segment, S4. In FIG. 6b the content information segment $50_2$ is arranged substantially symmetrically within the corresponding silent route segment S4. The content information segment $50_2$ is arranged such that the gap $50_1$ to a preceding boundary of the silent route segment S4 is less than the gap $50_3$ to a succeeding boundary of the silent route segment S4.

Having the content information segment arranged symmetrically (and announced symmetrically) allows a user the same amount of time to digest a previous guidance instruction and to prepare for the next guidance instruction.

FIGS. 6c to 6f show alternative embodiments in which the content information segment $50_2$ is arranged non-symmetrically within a silent route segment S4.

For example, in FIG. 6c the content information segment $50_2$ is arranged within a silent route segment S4 such that the gap $50_1$ to a preceding boundary of the silent route segment is less than the gap $50_3$ to a succeeding boundary of the silent route segment S4.

In the example of FIG. 6d the content information segment $50_2$ is arranged within a silent route segment S4 such that the gap $50_1$ to a preceding boundary of the silent route segment is more than the gap $50_3$ to a succeeding boundary of the silent route segment S4.

These alternative embodiments can provide advantages where it is beneficial to allow more time on either side. For example, it might be fine to announce content information immediately (or almost immediately) after a previous guidance instruction, but desirable to allow more of a gap before the announcement of the next guidance instruction, so that the driver can gather his/her thoughts.

FIG. 6e shows an example where the content information $50_2$ is arranged next to a preceding boundary of the silent route segment S4, and having a gap $50_3$ before a succeeding boundary of the silent route segment S4.

FIG. 6f shows an example where the content information $50_2$ is arranged to have a gap $50_1$ after a preceding boundary of the silent route segment S4, and arranged next to a succeeding boundary of the silent route segment S4.

It is noted that two or more content information segments can have different time durations, which are a function of the different time durations of two or more corresponding silent route segments.

In addition, it is noted that the position of a content information segment within one silent route segment may differ from the position of a content information segment in a different silent route segment (for example depending on the size of the content information segment and/or silent route segment).

FIGS. 7a and 7b illustrate how an embodiment of the invention can be configured to handle changes to a route, for example whereby re-routing information is received to re-route a driver to avoid traffic or an accident, or where the driver decides to deviate from the suggested route. FIG. 7a shows a typical route having route segments S1 to S15 from a start point to an end point. In accordance with the embodiments described above, one or more silent route segments will have been determined for this original route from the start point to the end point. For example, in FIG. 7a the silent route segments are shown as route segments S4, S9 and S12. The content information to be announced will have therefore been partitioned into one or more content information segments for announcement during these silent route segments S4, S9, S12, as described above.

However, a re-routing event after route segment S8 causes at least one route segment for the remainder of the route to change, for example as shown in FIG. 7b.

In response to such a re-routing event an embodiment of the invention can be adapted to receive updated route information comprising one or more route segments, wherein at least one route segments differs from a previously received route segment. The method comprises the step of determining a new set of one or more updated silent route segments for the updated route information. For example, in FIG. 7*b* the updated silent route segments comprise a silent route segment S19. For any content information which has not yet been announced, the method involves partitioning such content information into a plurality of updated content information segments, for example into an updated content information segment corresponding to S19 in FIG. 7*b*. As such, following a re-routing event the content information which remains to be announced is effectively partitioned again so that it matches the silent route segment(s) in the new route.

In the event that it is not possible to partition the content information into the silent route segments which are available (either in this embodiment or the embodiments described above), according to one option the apparatus is configured to inform the driver, for example when arrived at the destination, that a part of the content information has not been read out and is still available in the "buffer". The driver then has the option of choosing to listen to this remaining part (for example after parking at the destination before leaving the car) or to ignore the remaining part.

Figure 8:
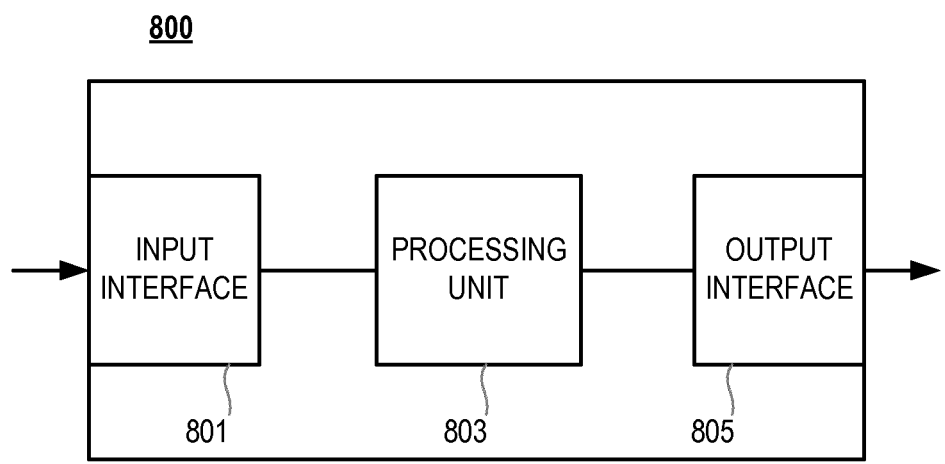
FIG. 8 shows an apparatus according to an embodiment of the present invention.

FIG. 8 shows an apparatus 800 according to an embodiment of the invention for announcing content information in a navigation system, wherein the content information relates to non guidance-direction instructions. The apparatus 800 comprises an input interface 801 adapted to receive route information, the route information comprising a plurality of route segments that constitute a route from a start point to an end point, each route segment having an estimated time period for completion. The input interface 801 is also adapted to receive content information which is to be announced.

A processing unit 803 is configured to determine whether one or more of the route segments comprises an estimated time period for completion which is above a threshold value and, if so, allocate such route segments as silent route segments. An output interface 805 is provided for outputting content information which is to be announced in one or more of the silent route segments.

A voice synthesizer, for example already forming part of a navigation system, can be used to announce the content information. It is noted that the apparatus 800 can form part of a sub-module which is used in conjunction with other devices, for example with an existing navigation system, or form an integral part of such a navigation system. The apparatus may be used with an integral voice synthesizer or an external voice synthesizer.

In the apparatus 800 of FIG. 8, according to one embodiment the processing unit 803 is adapted to partition the content information into a plurality of content information segments, such that each content information segment can be announced in a corresponding silent route segment.

In one embodiment the processing unit 803 can be configured to form a list of silent route segments and an associated duration of each silent route segment (for example as described above in FIG. 3), and partition the content information such that the duration of a content information segment is a function of the duration of a corresponding silent route segment.

For example, the processing unit 803 can be configured to partition the content information such that the duration of a content information segment is substantially equal to the duration of a corresponding silent route segment (as described in FIG. 4 above).

Alternatively, the processing unit 803 can be configured to partition to content information such that the duration of a content information segment is less than the duration of a corresponding silent route segment (as described in FIG. 5 above).

The processing unit 803 can be configured to: arrange the content information segment to be substantially symmetrically within a corresponding silent route segment; or arrange the content information segment to be non-symmetrically within a silent route segment; or arrange the content information segment to be within a silent route segment such that the gap to a preceding boundary of the silent route segment is less than the gap to a succeeding boundary of the silent route segment; or arrange the content information segment to be within a silent route segment such that the gap to a preceding boundary of the silent route segment is more than the gap to a succeeding boundary of the silent route segment.

Furthermore, the processing unit 803 can be configured to partition two or more content information segments to have different time durations which are a function of the different time durations of two or more corresponding silent route segments.

According to one embodiment the input interface 801 is adapted to receive updated route information comprising one or more route segments, wherein at least one route segments differs from a previously received route segment. The processing unit 803 is adapted to determine a new set of one or more updated silent route segments for the updated route information, and, for any content information which has not yet been announced, partition such content information into a plurality of updated content information segments corresponding to the updated silent route segments.

The apparatus of FIG. 8 can form a stand-alone module (in either hardware or software) which is used in conjunction with other modules of a navigation system. According to one aspect of the invention there is provided a navigation device comprising an apparatus as described above.

According to another aspect of the invention, there is provided a computer program product for announcing content information in a navigation system, comprising code for causing, when executed, a navigation device to execute the method described above.

The embodiments of the invention provide a user, such as a driver, with a comprehensive set of information about a destination for example, or points along the route, while driving and with a full integration with a conventional "turn-by-turn" satellite-based navigation system.

Figure 9:
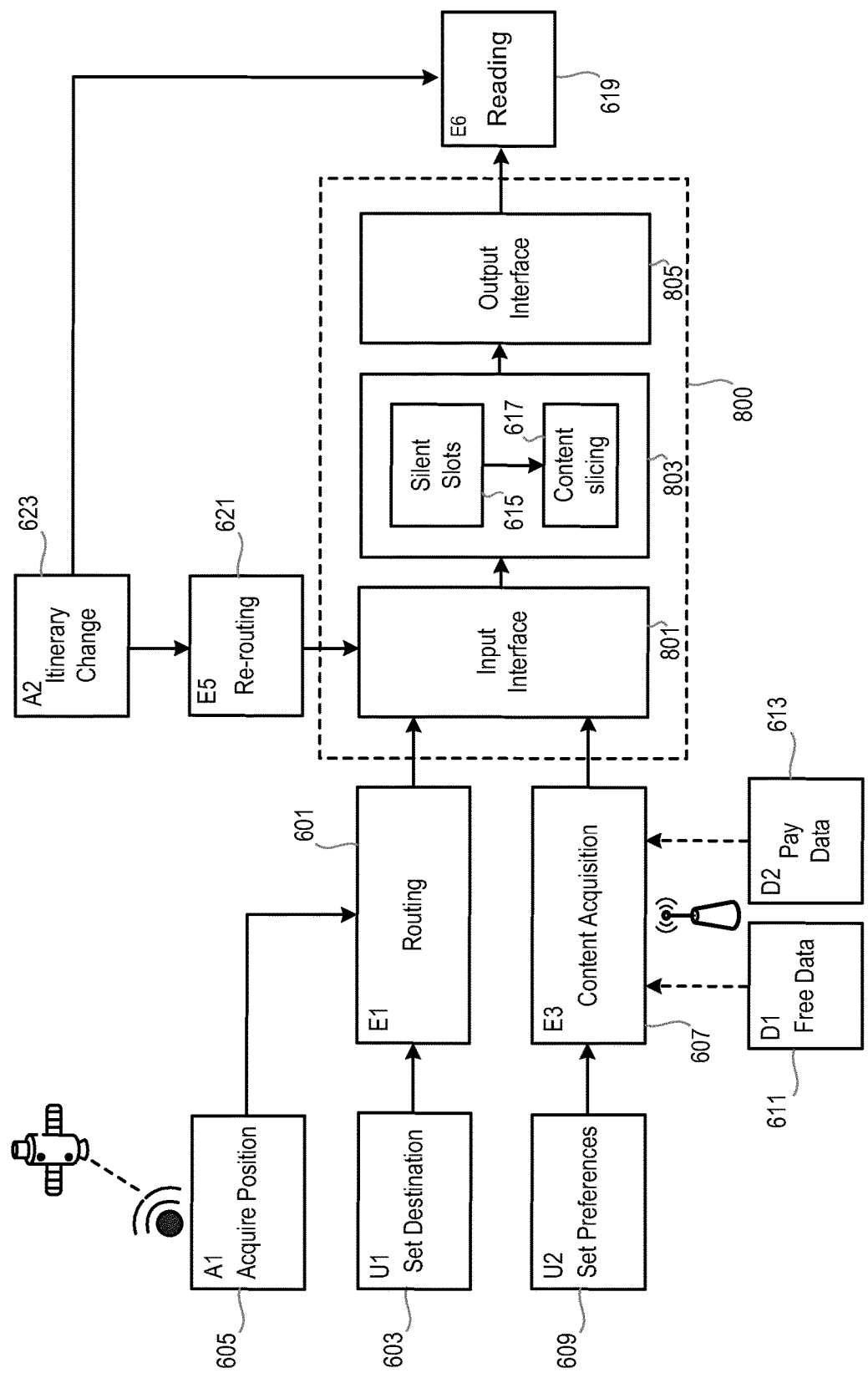
FIG. 9 shows a typical system embodying an apparatus according to an embodiment of the present invention.

With reference to FIG. 9, the following section describes how an apparatus as described above may be used with a navigation system, and the typical step-by-step procedure in which embodiments of the invention may be used by a user.

The user begins by switching on the device and activating the system.

Next, the user sets his preferences, for example using a Set Preferences functional unit 609. The preferences can relate, for example, to the destination, such as providing a destination overview, things to do, events in the following days, nightlife, suggested tours, tips and tricks, tourist traps, local customs, warnings and dangers, plus one or more specific options relating to the delivery of the content information, such as setting the threshold value and/or guard time mentioned above. Preferences can refer to the surroundings of the current position, such as suggested stops within 20 kms, local news and curiosities.

The user sets the desired destination, for example using a Set Destination functional unit 603.

The system acquires the current position using an Acquire Position functional unit 605, for example using a GPS detector, possibly assisted by mobile network (A-GPS).

The current position and destination are sent to a routing engine 601. This routing engine 601, by using a detailed database of maps and a routing algorithm, computes the best "turn-by-turn" path towards the destination. The outcome is route information comprising a sequence of route segments as described above, separated by "actions" such as "turn right", "turn left" and so on. Each route segment has an estimated duration for completion, i.e. an expected or estimated driving time. For example a road segment of 10 km has an estimated driving time of 10 minutes.

An apparatus 800 comprises an input interface 801 adapted to receive route information (for example either form a routing uniting 601 or rerouting unit 621), the route information comprising a plurality of route segments that constitute a route from a start point to an end point, each route segment having an estimated time period for completion. The input interface 801 is also adapted to receive content information which is to be announced (for example from a content acquisition unit 607). A processing unit 803 is configured to determine whether one or more of the route segments comprises an estimated time period for completion which is above a threshold value (for example using a functional unit 615 for determining silent slots) and, if so, allocate such route segments as silent route segments. The processing unit 803 can be further adapted to partition the content information into a plurality of content information segments (for example using a functional unit 617 for slicing the content information), such that each content information segment can be announced in a corresponding silent route segment. An output interface 805 is provided for outputting content information which is to be announced in one or more of the silent route segments.

In one example road segments with estimated driving time above a predefined threshold (e.g. 5 minutes) are eligible to be used to announce information to the user. These segments are termed "silent slots" or the "silent route segments" referred to above because they are not used to announce driving instructions.

The content acquisition module 607 is configured to retrieve the content information, for example audio and/or textual content from a remote source such as a cloud. This content information is downloaded by considering user preferences described above. A telecommunications module may be provided for connecting to the internet or cloud.

The functional unit 617, or content slicing module, is configured to partition or split the content information into one or more content information segments. For example, the content information can be partitioned into segments or portions which are long enough to fit the silent slots (silent route segments) in terms of estimated announcement time. In other words, if the first silent slot is estimated to be 10 minutes, a portion of text is taken from the downloaded content so that the text-to-speech engine will read this portion of text in no more than ten minutes. Other details of the partitioning, based on FIGS. 6a to 6f above, may also be applied by the second functional unit 617.

The final phase happens during a trip, shown in functional unit 619, whereby the system reads aloud driving instructions when needed and user selected content information in the silent route segments.

The embodiments can be configured such that driving instructions always have priority over the announcement of content information. If the navigation device has the need to recalculate the path on the fly, for example in response to road works or car accidents, the reading of user selected content is paused, and is retrieved or reorganized accordingly as described earlier in the application with reference to FIGS. 7a and 7b. The service can be suspended until the issue is solved. Such a re-routing can trigger new silent route segments to be determined, as described above.

With regard to making the announcements themselves, the quality of speech synthesis engines in existing navigation systems or smartphones is generally very good. However, such existing systems may not be considered sufficient to provide complex contents, especially in low end devices. Therefore, as an alternative, according to one embodiment the proposed method can comprise the steps of using a server based text to speech engine. In such a system the user preferred information could be converted from text to voice on a server and sent to the user device as a sequence of audio clips, for example mp3 clips (similar to podcasting) or in streaming. In this case additional audio content can be used to enrich the voice announcements (for example with music or sound effects, etc.). In such an embodiment the partitioning of the content information may be performed at least partly at a remote node.

The functions provided by embodiments of the invention may be configured as applications which can be downloaded to navigation devices as software updates. The embodiments of the invention also enable an "in-app" selling of premium content, as alternative to free content available on the internet.

The embodiments of the invention have a number of advantages for drivers. For example, the embodiments of the invention transform a navigation device into a "driver's companion" or a virtual tourist guide. They also allow useful information to be received while driving, saving time and arriving more informed to the destination. They also help drivers to remain vigilant even in boring road segments. They are very easy to be used by drivers (complexity is masked by the client and server software engines). The embodiments of the invention also provide business opportunities for content providers. Also, independent or local content providers are able to sell particular content for a fee (in a way similar to the app stores).

The embodiments of the invention do not necessarily require particular hardware enhancements, and can be back compatible with existing hi-level devices (such as smartphones). If desired, certain embodiments can push certain operations to remote servers, for example to obtain better quality especially in the text-to-speech conversion.

The embodiments described above have explained how content information can be announced to a user. The embodiments of the invention may be adapted such that a user can also ask questions during one or more silent route segments, with answers then being provided in one or more silent route segments (including the same and/or different route segments).

According to one embodiment, different thresholds may be applied for allocating route segments as silent route segments. For example, shorter route segments may be allocated as silent route segments for receiving questions, with longer route segments being allocated as silent route segments for providing the corresponding answers. In such an embodiment the system can be configured to prompt the user for questions during certain route segments, for example "would you like to ask a questions about your destination?", and the retrieved content information (for example in answer to the question) then being announced in one or more silent route segments.

The embodiments of the invention may be used in cooperation with any voice processing system. For example the Siri™ application by Apple™ uses a natural language user interface to answer questions, make recommendations, and performs actions by delegating requests to a set of Web services. The embodiments of the invention may be used in cooperation with such applications, for partitioning content to be announced in appropriate silent route segments. Likewise, the Google Now™ application is similar, since it allows a user to simply ask questions and obtain answers without typing. Using voice recognition with text streamed on the fly, it get answers spoken directly back to the user. Both these applications operate using a "question & answer" method, and embodiments of the invention may be adapted to tailor such questions and answers such that they are partitioned into one or more silent route segments as described above. In such embodiments the method may further comprise the steps of prompting and/or receiving user input during one or more of the silent route segments, processing the input, and delivering a response during one or more silent route segments. This has the benefit of allowing the system to prompt the user during certain segments, such as "would you like to know anything about the surrounding area?", and respond to user questions such as "Is there a fuel station nearby?".

The embodiments of the invention have the advantage that Information is smoothly integrated with the standard voice guidance commands which provide "turn-by-turn" instructions, rather than merely displaying information on the screen with ad-hoc icons, or announcing information based purely on position information.

Content information may be automatically selected from the cloud, according to the user preferences and interests.

Information can be provided that is focused on the destination, even when not near the destination, thereby allowing a driver and passengers to arrive more informed.

It is noted that the embodiments can be configured such that driver instructions have priority over content announcements.

The embodiments of the invention provide a dynamic partitioning of content announcements into a plurality of sub-portions, each sub-portion selected to correspond to a silent slot in the traffic announcements.

The embodiments described above can be used in a "connected vehicle cloud" ecosystem which provides advanced infotainment services, whereby drivers and passengers are able to access applications for information, navigation, and entertainment from a screen in the vehicle.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for announcing content information in a navigation system, wherein the content information relates to non guidance-direction instructions, the method comprising the steps of:

receiving route information, the route information comprising a plurality of route segments that constitute a route from a start point to an end point, each route segment having an estimated time period for completion;
receiving the content information which is to be announced;
determining, by a processor, whether one or more of the route segments comprises an estimated time period for completion which is above a threshold value and, if so, allocating such route segments as silent route segments;
partitioning the content information into a plurality of content information segments including a first content information segment and a second content information segment;
announcing the first content information segment in a first silent route segment; and
announcing the second content information segment in a second silent route segment, wherein
a first route segment of the plurality of route segments is allocated as a first silent route segment,
a second route segment of the plurality of route segments is allocated as a second silent route segment,
the partitioning step comprises the steps of: a) forming a list of the silent route segments and an associated duration of each silent route segment and b) partitioning the content information such that a) the duration of the first content information segment is a function of the duration of the first silent route segment and b) the duration of the second content information segment is a function of the duration of the second silent route segment.

2. The method of claim 1, wherein the duration of a content information segment is substantially equal to the duration of a corresponding silent route segment.

3. The method of claim 1, wherein the duration of a content information segment is less than the duration of a corresponding silent route segment.

4. The method of claim 3 wherein:
the content information segment is arranged substantially symmetrically within a corresponding silent route segment; or
the content information segment is arranged non-symmetrically within a silent route segment; or
the content information segment is arranged within a silent route segment such that the gap to a preceding boundary of the silent route segment is less than the gap to a succeeding boundary of the silent route segment; or
the content information segment is arranged within a silent route segment such that the gap to a preceding boundary of the silent route segment is more than the gap to a succeeding boundary of the silent route segment.

5. The method of claim 1, wherein two or more content information segments have different time durations, which are a function of the different time durations of two or more corresponding silent route segments.

6. The method of claim 1, further comprising the steps of:
receiving updated route information comprising one or more route segments, wherein at least one route segment differs from a previously received route segment;
determining a new set of one or more updated silent route segments for the updated route information; and
for any content information which has not yet been announced, partitioning such content information into a plurality of updated content information segments corresponding to the updated silent route segments.

7. A computer program product for announcing content information in a navigation system, comprising a non-transitory computer readable medium storing code for causing, when executed, a navigation device to execute the method of claim 1.

8. An apparatus for announcing content information in a navigation system, wherein the content information relates to non guidance-direction instructions, the apparatus comprising:
   an input interface adapted to receive: route information, the route information comprising a plurality of route segments that constitute a route from a start point to an end point, each route segment having an estimated time period for completion; and content information which is to be announced;
   a processing unit configured to determine whether one or more of the route segments comprises an estimated time period for completion which is above a threshold value and, if so, allocate such route segments as silent route segments; and
   an output interface for outputting content information which is to be announced in one or more of the silent route segments, wherein
   the processing unit is adapted to partition the content information into a plurality of content information segments, such that each content information segment can be announced in a corresponding silent route segment and
   the processing unit is configured to: a) form a list of silent route segments and an associated duration of each silent route segment and b) partition the content information such that the duration of a content information segment is a function of the duration of a corresponding silent route segment.

9. The apparatus of claim 8, wherein the processing unit is configured to partition the content information such that the duration of a content information segment is substantially equal to the duration of a corresponding silent route segment.

10. The apparatus of claim 8, wherein the processing unit is configured to partition the content information such that the duration of a content information segment is less than the duration of a corresponding silent route segment.

11. The apparatus of claim 10 wherein the processing unit is configured to:
    arrange the content information segment to be substantially symmetrically within a corresponding silent route segment; or
    arrange the content information segment to be non-symmetrically within a silent route segment; or
    arrange the content information segment to be within a silent route segment such that the gap to a preceding boundary of the silent route segment is less than the gap to a succeeding boundary of the silent route segment; or
    arrange the content information segment to be within a silent route segment such that the gap to a preceding boundary of the silent route segment is more than the gap to a succeeding boundary of the silent route segment.

12. The apparatus of claim 8, wherein processing unit is configured to partition two or more content information segments to have different time durations which are a function of the different time durations of two or more corresponding silent route segments.

13. The apparatus of claim 8 wherein:
    the input interface is adapted to receive updated route information comprising one or more route segments, wherein at least one route segment differs from a previously received route segment; and
    wherein the processing unit is adapted to determine a new set of one or more updated silent route segments for the updated route information, and, for any content information which has not yet been announced, partition such content information into a plurality of updated content information segments corresponding to the updated silent route segments.

14. The apparatus of claim 8, wherein the apparatus is comprised in a navigation device.

\* \* \* \* \*